Jan. 23, 1940.     O. H. BASQUIN ET AL     2,188,261
WEIGHING APPARATUS
Filed July 30, 1936     12 Sheets-Sheet 2
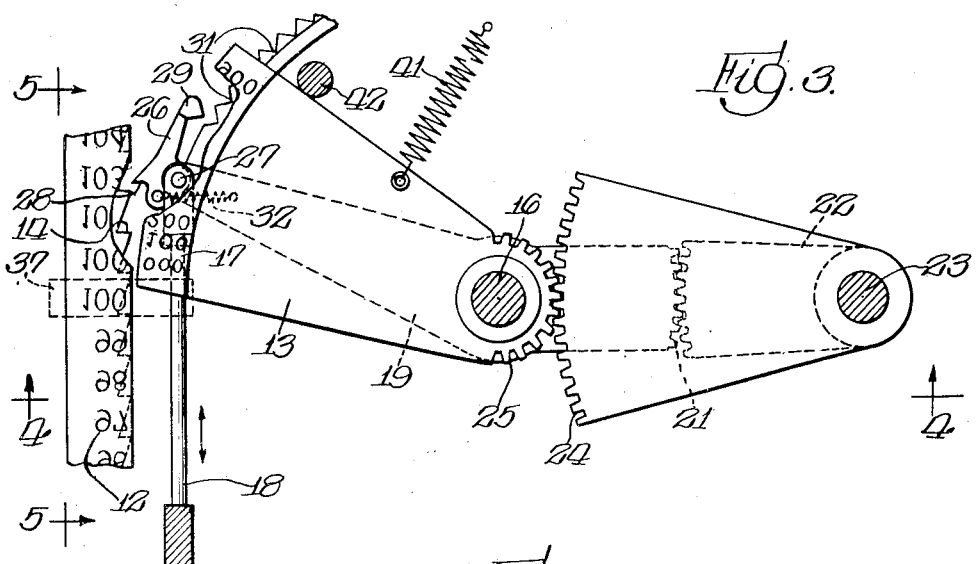
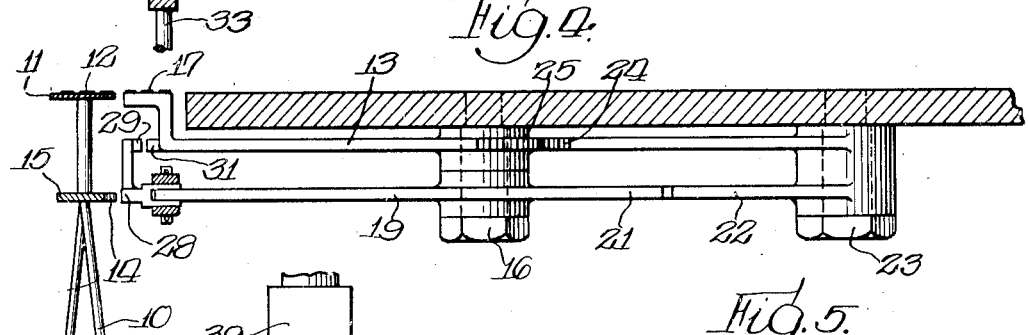
Inventors:
Otin H. Basquin,
Otto P. Haegele,
By Roland E. Rehm Atty.

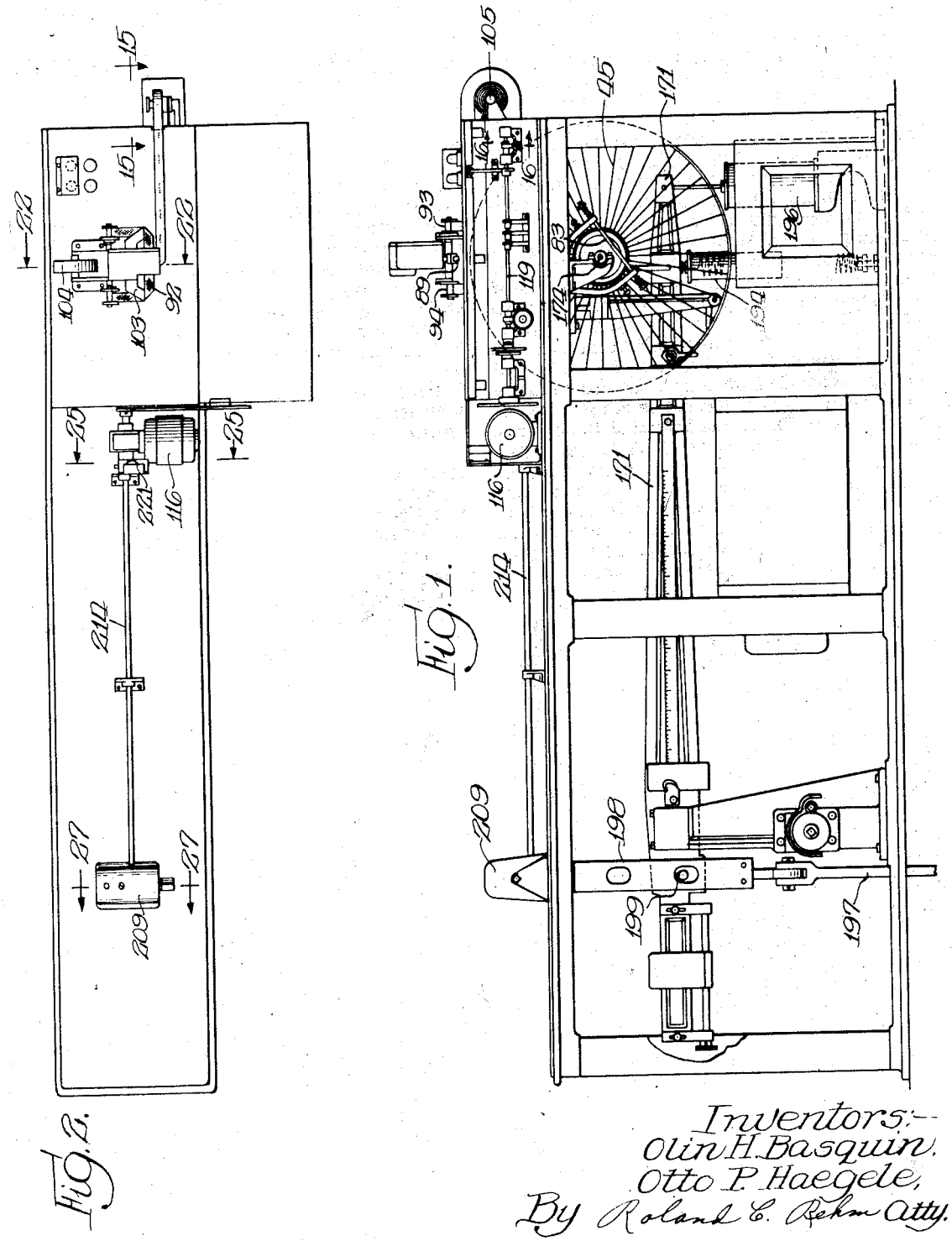

Jan. 23, 1940.　　　O. H. BASQUIN ET AL　　　2,188,261
WEIGHING APPARATUS
Filed July 30, 1936　　　12 Sheets-Sheet 3
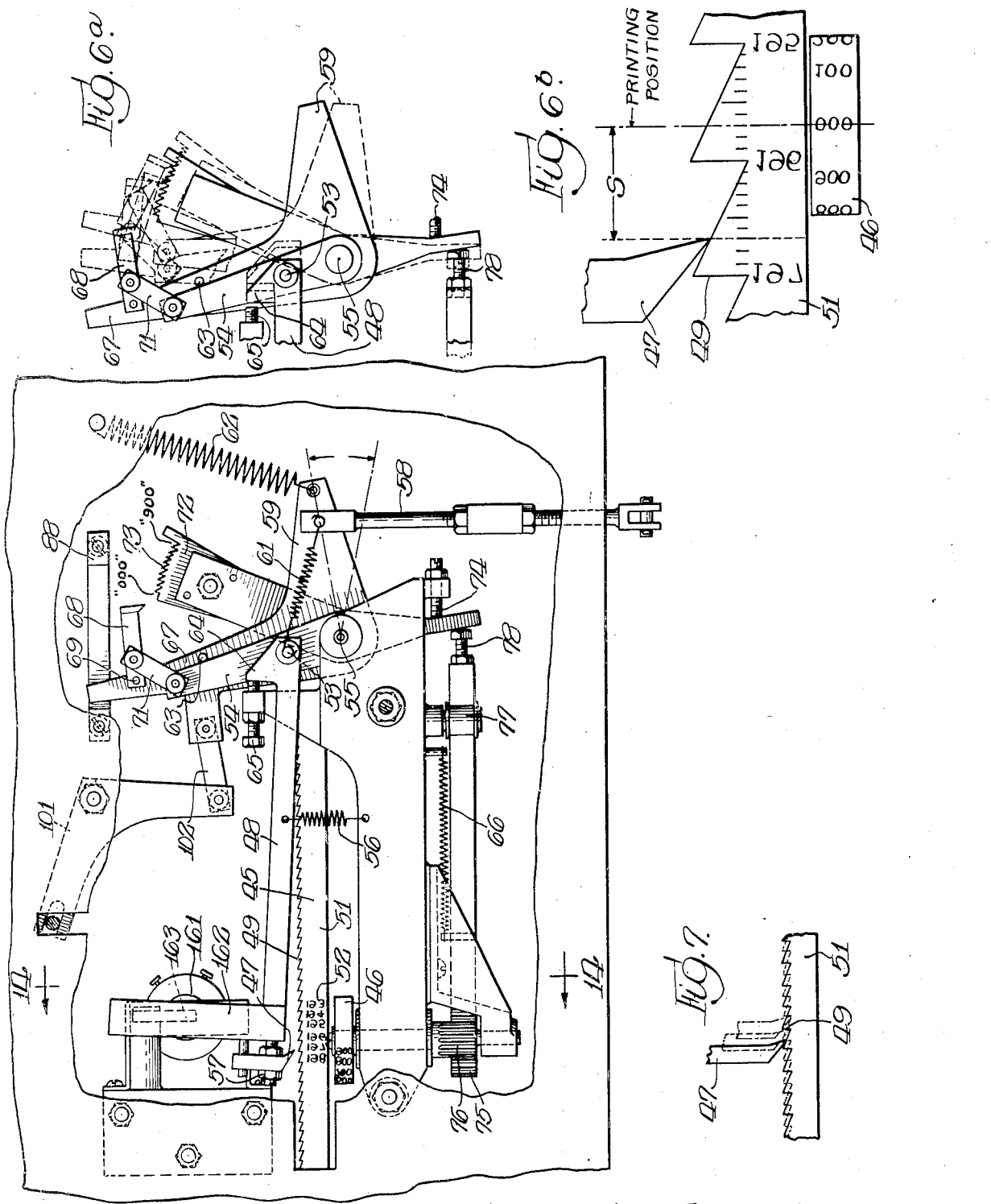
Inventors:—
Olin H. Basquin,
Otto P. Haegele,
By Roland C. Rehm Atty.

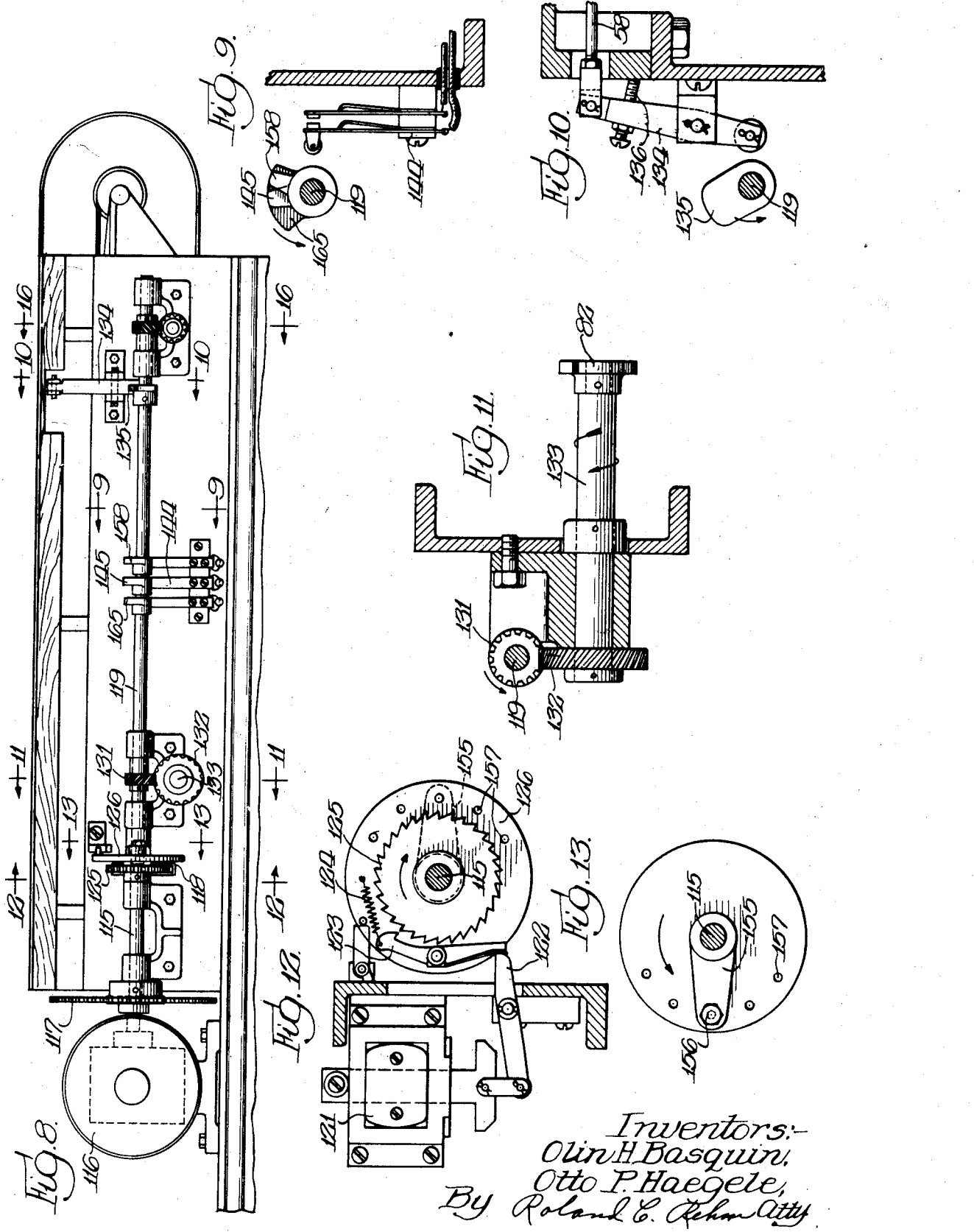

Jan. 23, 1940.   O. H. BASQUIN ET AL   2,188,261
WEIGHING APPARATUS
Filed July 30, 1936   12 Sheets-Sheet 5

Inventors:-
Olin H. Basquin,
Otto P. Haegele,
By Roland C. Rehm Atty.

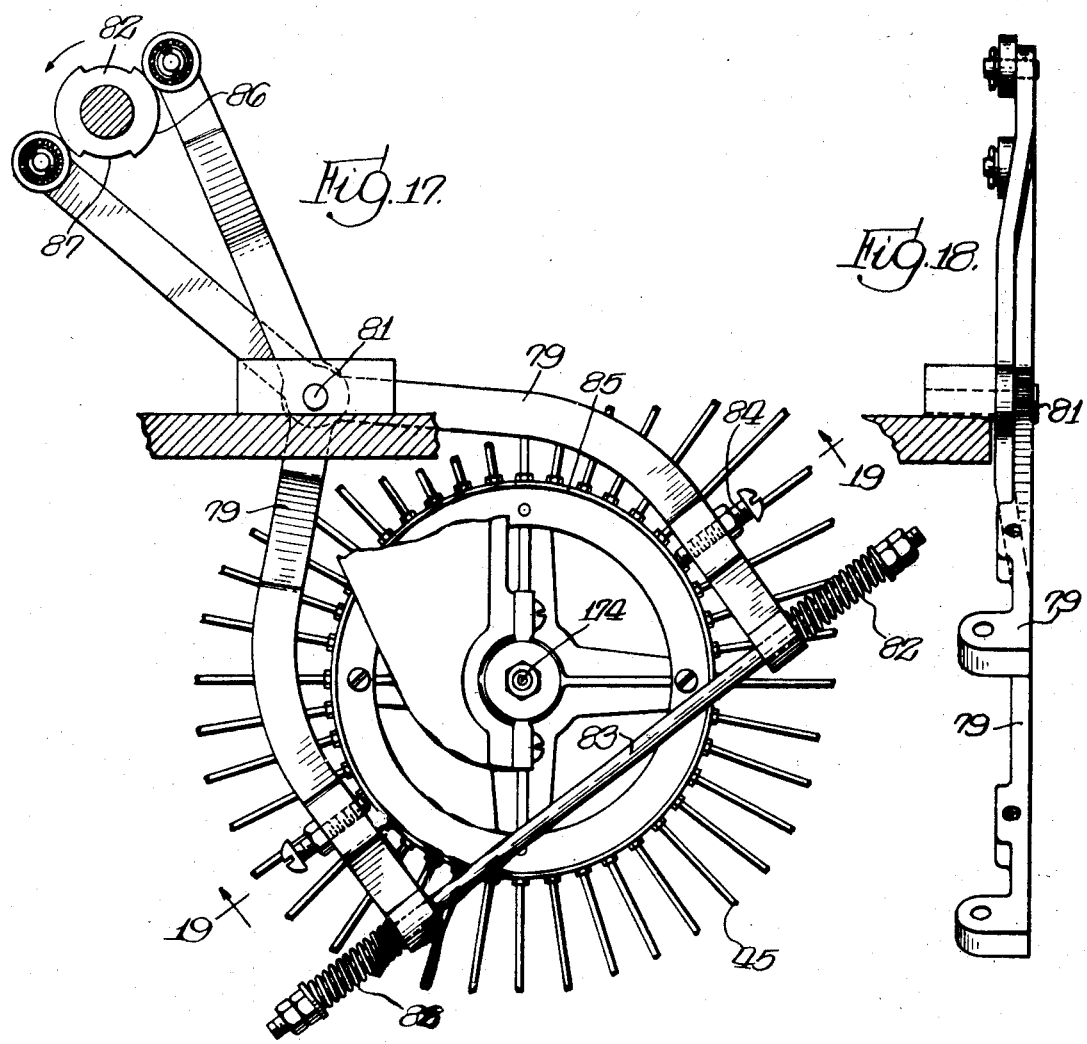
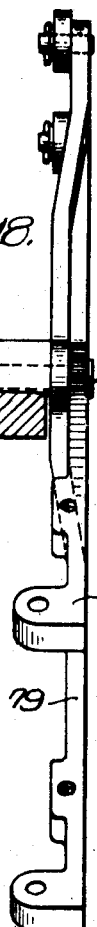
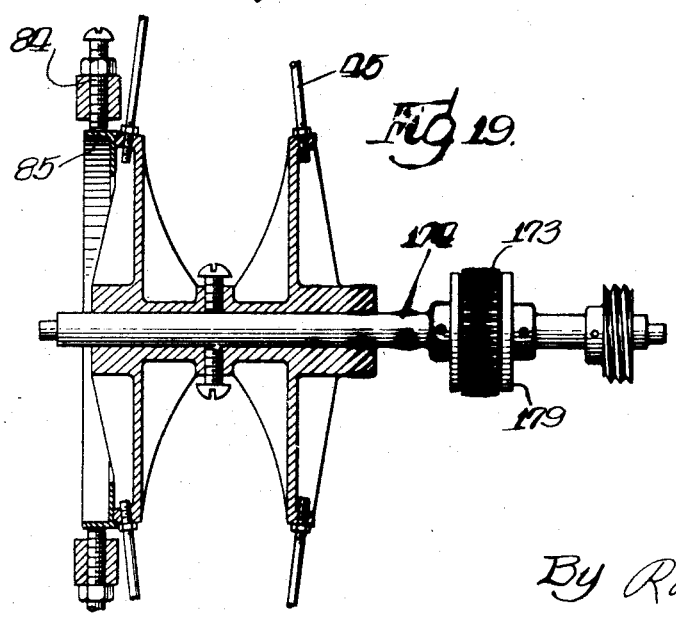

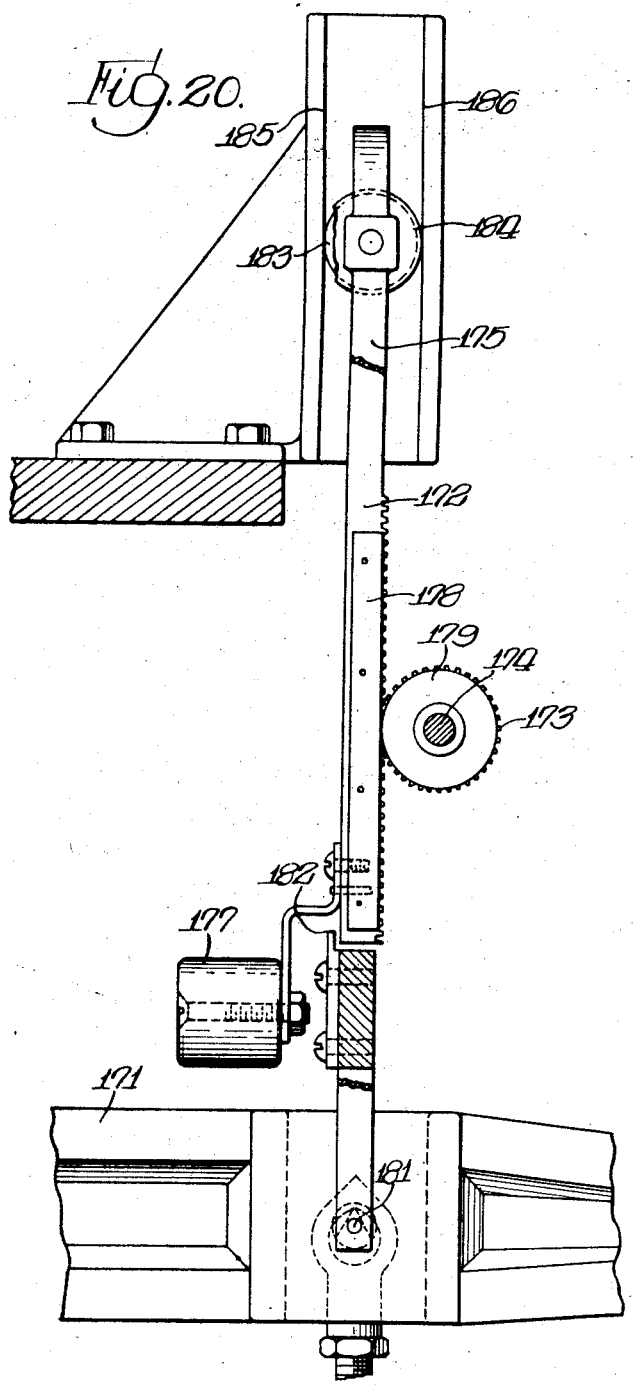
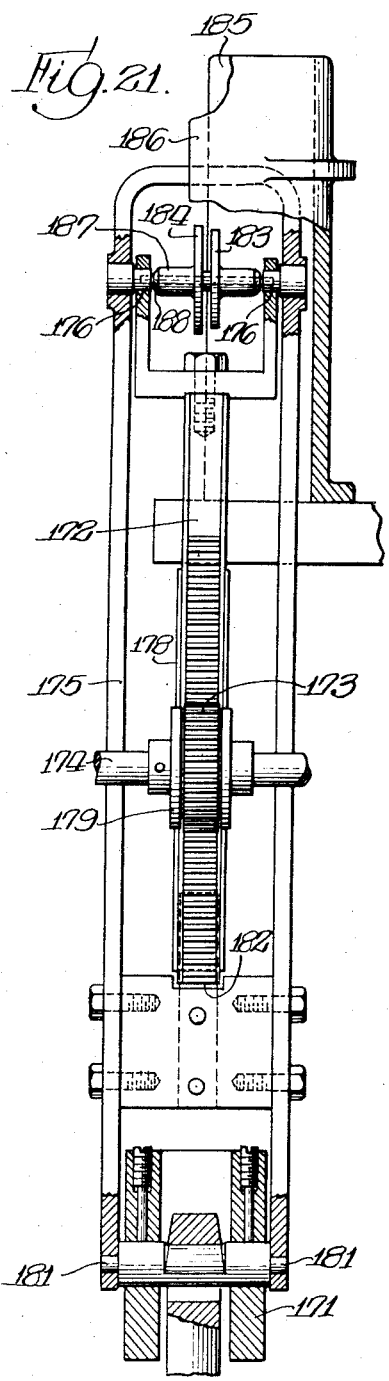

Jan. 23, 1940.     O. H. BASQUIN ET AL     2,188,261
WEIGHING APPARATUS
Filed July 30, 1936     12 Sheets-Sheet 8
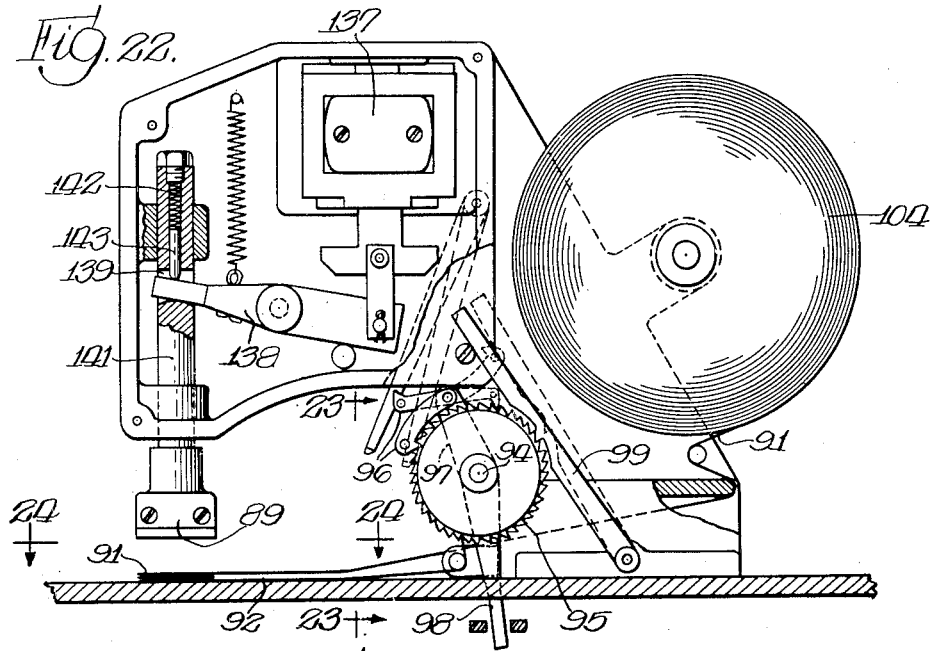
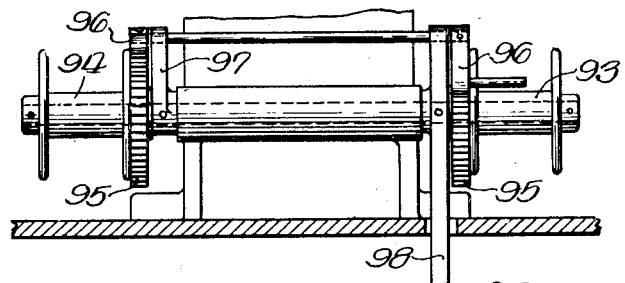
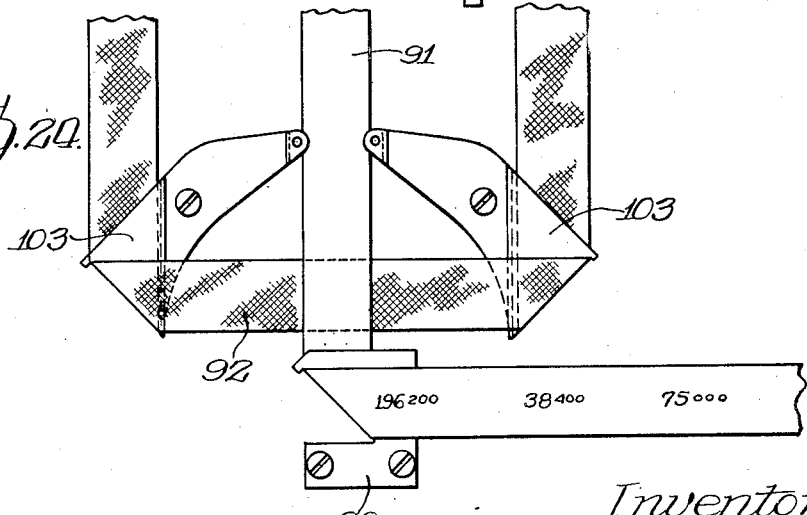
Inventors:—
Olin H. Basquin,
Otto P. Haegele,
By Roland C. Rehm Atty.

Jan. 23, 1940. O. H. BASQUIN ET AL 2,188,261

WEIGHING APPARATUS

Filed July 30, 1936 12 Sheets-Sheet 9

Inventors:—
Olin H. Basquin,
Otto P. Haegele,
By Roland C. Behm Atty.

Jan. 23, 1940.   O. H. BASQUIN ET AL   2,188,261
WEIGHING APPARATUS
Filed July 30, 1936   12 Sheets-Sheet 10
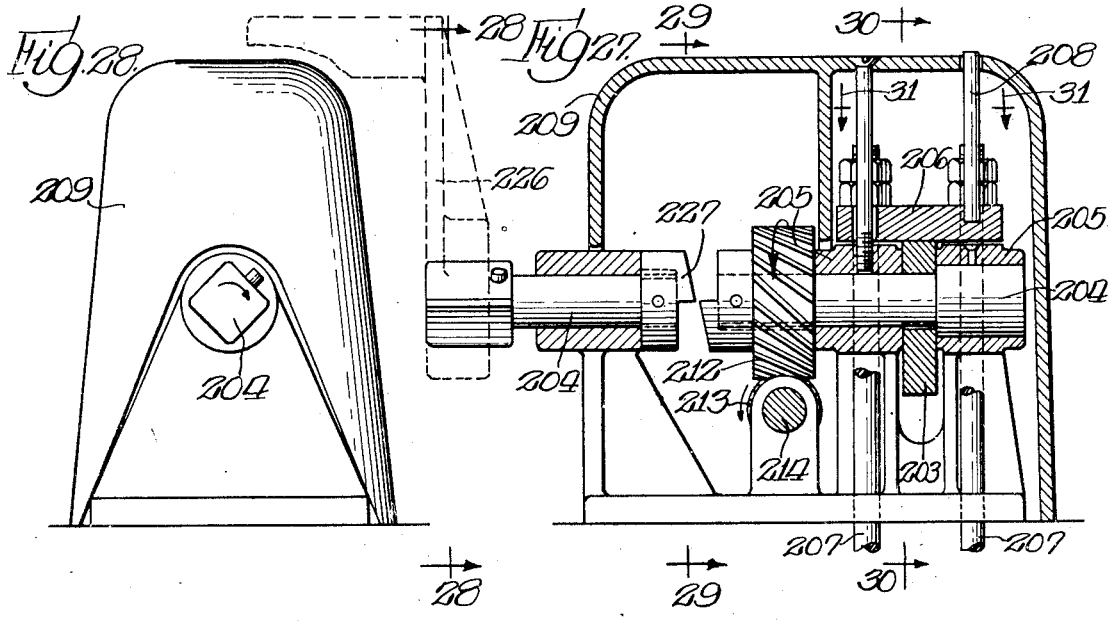
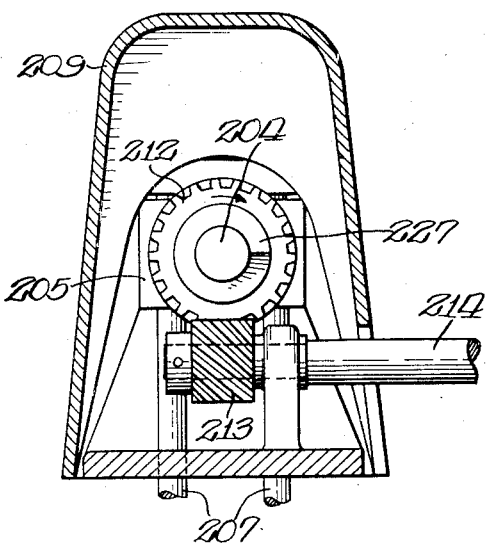
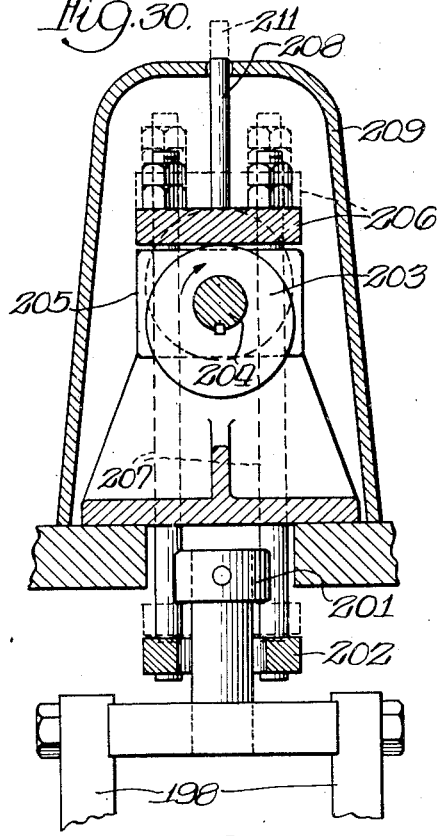
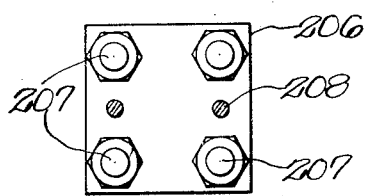
Inventors:—
Olin H. Basquin,
Otto P. Haegele,
By Roland C. Rehm Atty.

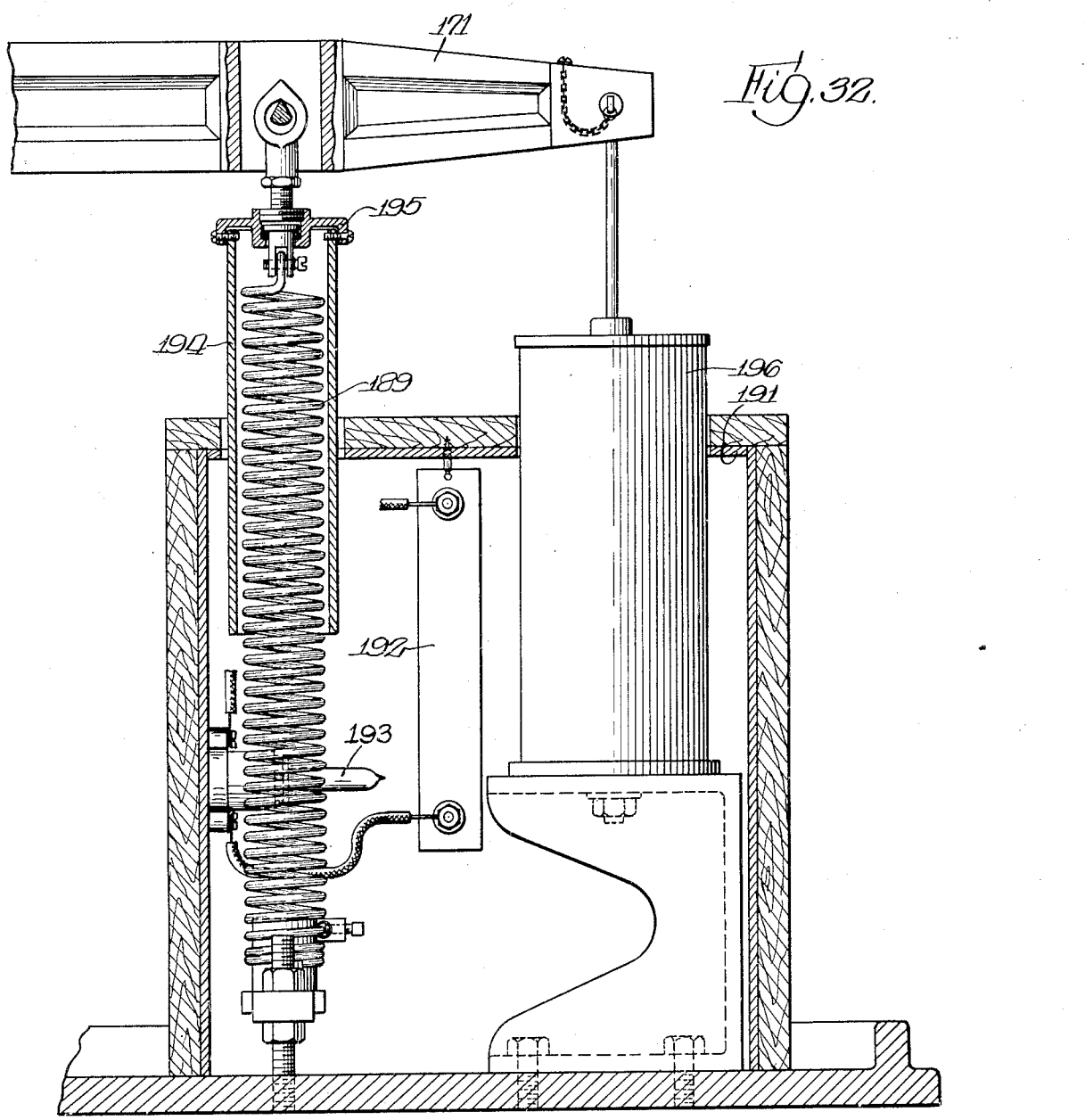

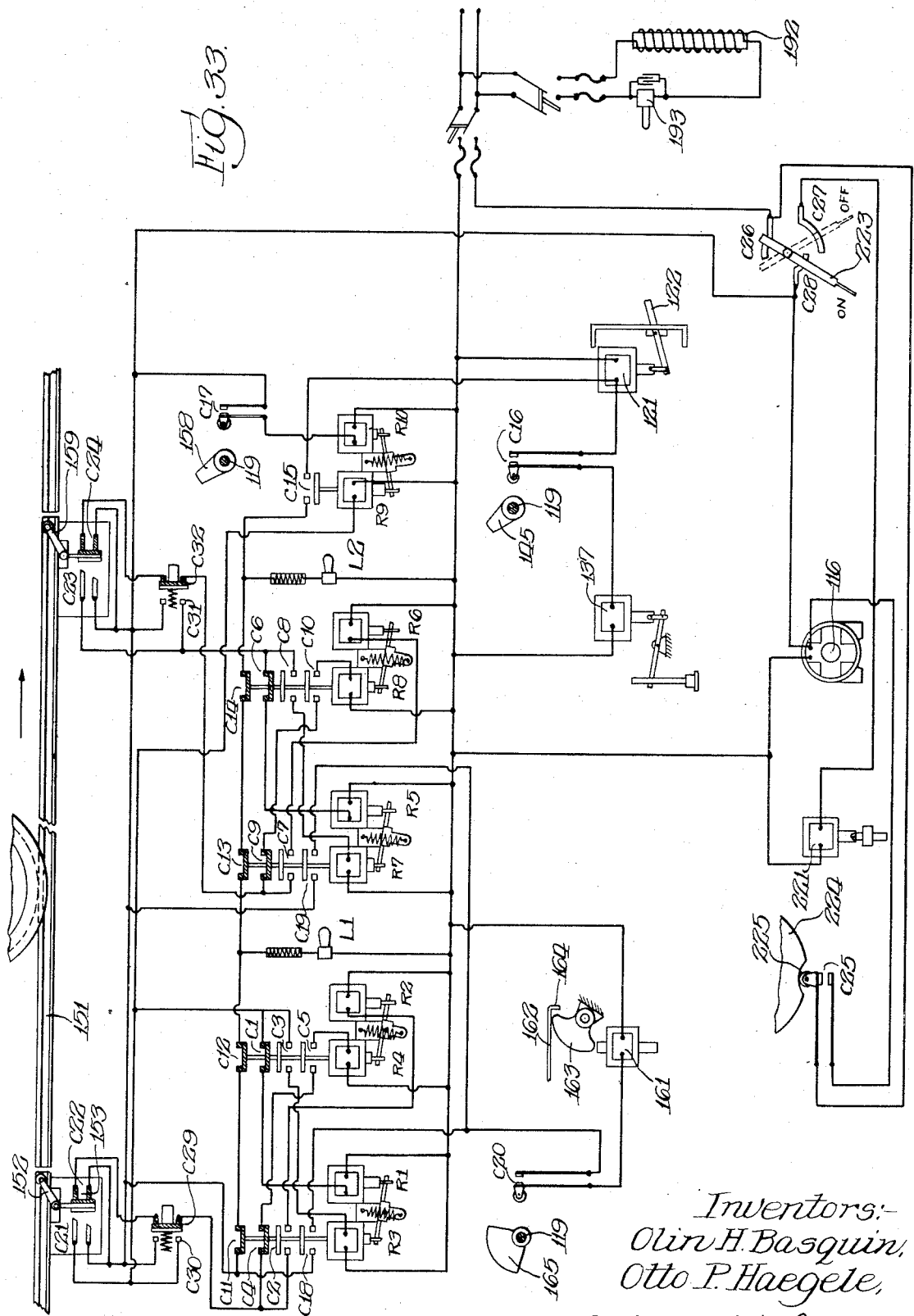

Patented Jan. 23, 1940

2,188,261

UNITED STATES PATENT OFFICE 2,188,261

WEIGHING APPARATUS

Olin H. Basquin, Evanston, and Otto P. Haegele, Chicago, Ill., assignors to Streeter-Amet Company, Chicago, Ill., a corporation of Illinois Application July 30, 1936, Serial No. 93,406

25 Claims. (Cl. 265—5)

This invention relates to weighing apparatus, and among other objects aims to provide improved recording mechanism which will print or exhibit a direct or numerical record of the weight of a load.

Another object is to equip a beam or similar load responsive member with compensating devices for securing displacements of the load indicating or recording devices substantially proportional to the angular displacement of the beam and therefore to the load on the scale.

Other objects will appear from the specification and claims.

The nature of the invention may be readily understood by reference to one illustrative construction shown in the accompanying drawings.

In said drawings:

Fig. 1 is an elevation of the weighing and recording apparatus;

Fig. 2 is a plan view thereof;

Fig. 3 is a fragmentary plan view of the printing or load exhibiting elements and operating mechanism;

Fig. 4 is a fragmentary elevation thereof taken from the plane 4—4 of Fig. 3;

Fig. 5 is a fragmentary elevation on a somewhat larger scale, taken from the plane 5—5 of Fig. 3;

Fig. 6 is a plan view illustrating a different arrangement of printing or load exhibiting elements and their operating mechanism;

Figure 14:
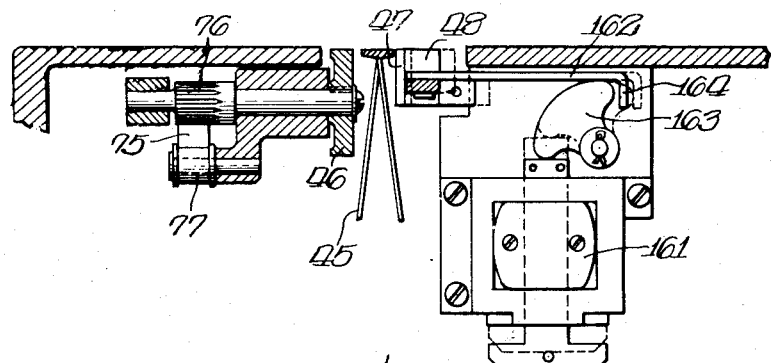
Figure 15:
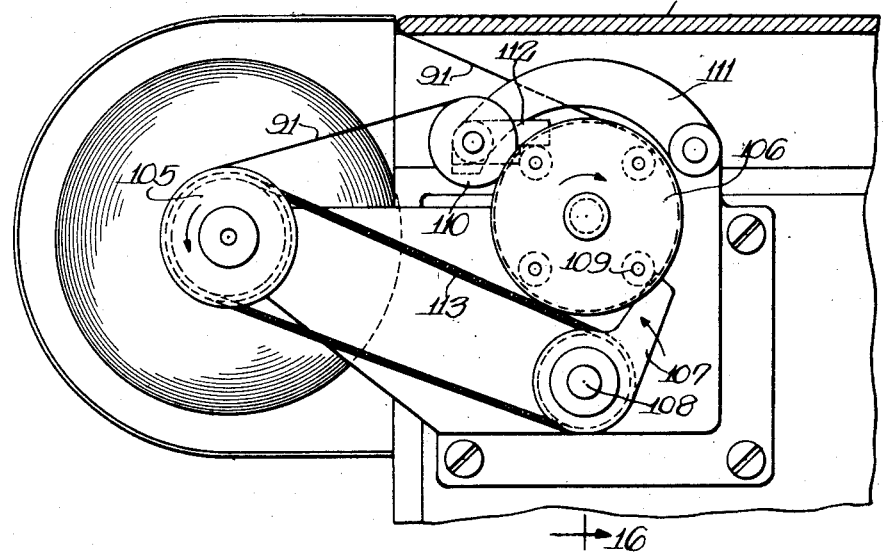
Figure 16:
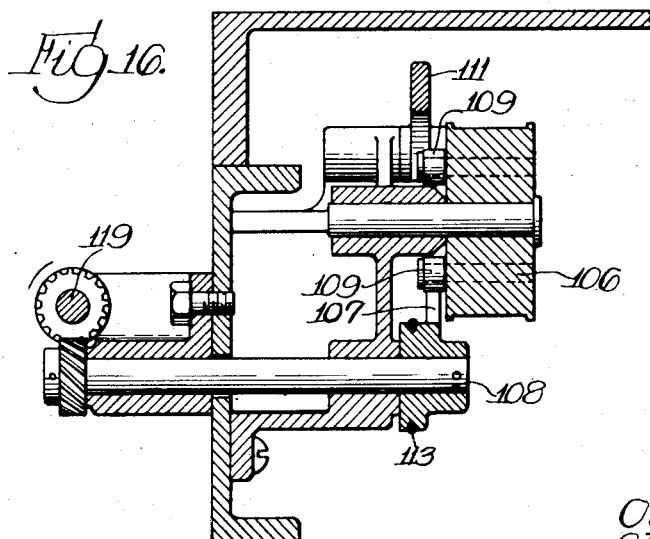
Figure 25:
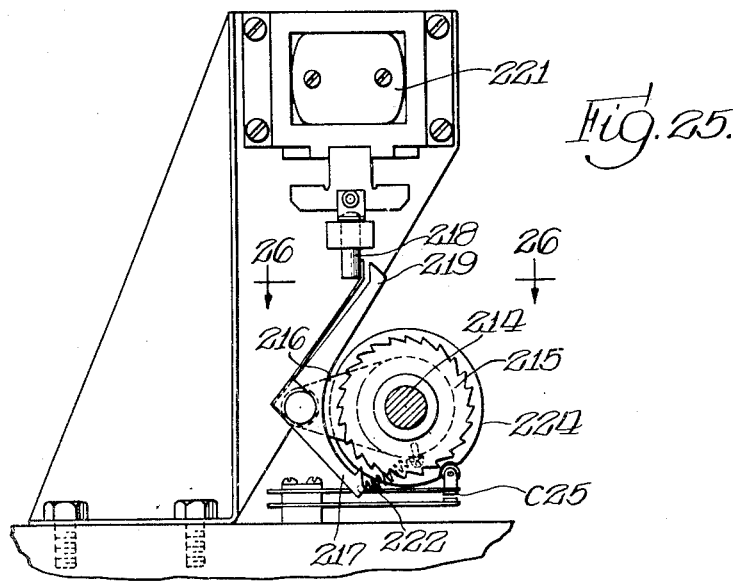
Figure 26:
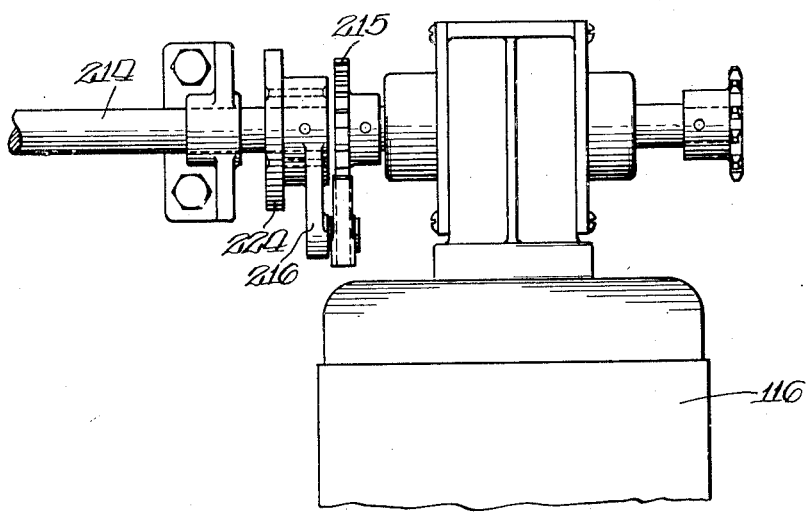

Fig. 6ª is a fragmentary plan view which further illustrates the operation of the mechanism shown in Fig. 6;

Fig. 6ᵇ is a diagram further illustrating the operation of the aforesaid mechanism;

Fig. 7 is a plan view on a somewhat larger scale illustrating the operation of a detail of the mechanism shown in Fig. 6;

Fig. 8 is an elevation of the mechanism for controlling the operation of apparatus;

Fig. 9 is a sectional elevation showing electric switches and the method of controlling their sequence of operation, taken on the plane 9—9 of Fig. 8;

Fig. 10 is a sectional elevation showing another detail, taken on the plane 10—10 of Fig. 8;

Fig. 11 is a sectional elevation taken on the plane 11—11 of Fig. 8 showing the brake-operating cam and its actuating mechanism;

Fig. 12 is a sectional elevation taken from the plane 12—12 of Fig. 8 showing a clutch for driving the controlling mechanism through a single cycle of operations;

Fig. 13 is a sectional elevation taken on the plane 13—13 of Fig. 8 showing the opposite side of the clutch mechanism;

Fig. 14 is a sectional elevation taken on the plane 14—14 of Fig. 6 showing safety mechanism for preventing injury to one of the printing elements;

Fig. 15 is an elevation taken from the plane 15—15 of Fig. 2 showing the tape rewinding mechanism;

Fig. 16 is a section taken on the plane 16—16 of Figs. 8 and 15;

Fig. 17 is an elevation on an enlarged scale of mechanism for holding or locking the printing element;

Fig. 18 is a side view thereof;

Fig. 19 is a sectional view thereof taken on the plane 19—19 of Fig. 17;

Fig. 20 is a side elevation of the mechanism for securing displacement of the printing element proportional to the angular displacement of the beam or other load responsive member;

Fig. 21 is a front view thereof as viewed from the right hand side of Fig. 20;

Fig. 22 is an elevation partly in section of the printing hammer operating and ink ribbon winding mechanisms taken on the plane 22—22 of Fig. 2;

Fig. 23 is an elevation of the ribbon winding mechanism taken from the plane 23—23 of Fig. 22;

Fig. 24 is a plan view of the arrangement of record tape and inking ribbon at printing position and taken from the plane 24—24 of Fig. 22;

Fig. 25 is an elevation taken from the plane 25—25 of Fig. 2, showing the mechanism for operating the beam locking mechanism;

Fig. 26 is a plan view thereof taken from the plane 26—26 of Fig. 25;

Fig. 27 is a section taken on the plane 27—27 of Fig. 2 showing beam lock operating mechanism;

Fig. 28 is an elevation of the housing thereof taken from the plane 28—28 of Fig. 27;

Figs. 29 and 30 are sectional elevations taken respectively on the planes 29—29 and 30—30 of Fig. 27;

Fig. 31 is a plan section taken from the plane 31—31 of Fig. 27;

Fig. 32 is a sectional elevation showing the load offsetting spring, the dash pot and the housings for maintaining uniform temperature conditions; and Fig. 33 is a diagram illustrating the controlling circuits.

The invention is here shown embodied in weighing apparatus having a rotary weight exhibiting element in the form of a type wheel or disc adapted to be moved to a position representing the weight of the load on the scale and carrying printing means in the form of type or the like so arranged as to be capable of making a printed record of the load. Printed weight records heretofore made have not been entirely satisfactory. Some of such records required interpolation to determine the weight of the load and others needed to be supplemented by additions of small increments of load which could not be printed.

The present invention makes it possible to exhibit or print a numerical weight record, which is complete without interpolation or addition, to the nearest weight unit or increment within the limits of design or accuracy of the scale. The recording apparatus will print the weight of the load as closely (i. e., to as small a unit or increment) as it could be read from a dial or other visual load indicating means.

The printing element is here shown in the form of a wheel 10 having a rim 11 carrying type 12. The range of travel of the type wheel is, in this instance, a single revolution or less, and the type representing large units of weight, preferably decimal units (i. e., 1, 10, 100, or 1000 pounds) are uniformly spaced around its active periphery. It will be understood that the printing element may be of any desired form. For example, the type may be radially arranged on the face of a disc. The expression "large unit" is employed to differentiate from the limiting units or increments which are the smallest units recorded by the apparatus. Such units should preferably not be greater than $\frac{1}{10}$ of 1% of the capacity of the scale. For example, the weight unit for a scale having a capacity of 100,000 pounds should not be greater than 100 pounds. The large unit of weight is made sufficiently large to permit adequate type spacing and type of such size as to insure complete legibility. The type are not adequately spaced if fragments of adjacent numbers are printed when a record is made.

Associated with the main printing element is an auxiliary or supplementary printing element 13 for printing the small units of weight and having a range or capacity equivalent to a single large unit. Where, as in the present instance, decimal units are employed, the small units may advantageously be $\frac{1}{10}$ of a large unit; and the supplementary printing element will, therefore, carry a series of 10 numbers running from "0" to "9" or decimal multiples thereof. It is not essential, however, that the small units be a decimal fraction of the large unit. For example, in some scales an increment of 25 pounds is customary. In that case, the supplementary printing unit may be designed to print only "00", "25", "50" and "75". The auxiliary printing element is designed to be moved to align one of its numbers with a number on the main printing wheel in printing position; and the printed record will, therefore, comprise a series of digits printed in alignment by both printing elements. In the present instance, the capacity of the scale is such that the large unit of weight represented on the type wheel is 1,000 pounds and that by the auxiliary printing element is 100 pounds.

In the apparatus illustrated in Figs. 3 to 5, the adjustment of the auxiliary printing element is determined by the size of the fractional large unit of weight in the weight of the load. In other words, it is determined by the amount which the weight of the load exceeds the nearest whole multiple of the large unit of weight. For example, if the weight of the load lies between 100,000 and 101,000 pounds, the fractional "large" unit (i. e., the amount in excess of 100,000) determines the adjustment or position of the auxiliary printing element.

In the present instance, the printing wheel is held against movement after it has arrived at a position representing the weight of the load. Thereupon, the auxiliary printing element is moved to a position determined by the aforesaid excess fractional unit to bring a number into alignment with printing position. The printing wheel is here shown provided with a plurality of stops in the form of teeth 14 having a spacing corresponding with the increments representing large units of weight and in this case so positioned angularly as to register with even whole multiples of the large units of weight. Such teeth are here formed in an inner rim 15.

The auxiliary printing element is here shown in the form of a sector pivoted on the axis 16 and carrying adjacent its periphery a series of ten numbers 17, representing 100 pound increments ranging from "0" to "900" and spaced apart a distance sufficient to permit the use of adequately large type. The range of movement of the type sector is, therefore, very much greater than that of type wheel for each large unit of weight. Each tooth 14 carried by the type wheel represents means (with reference to the large unit corresponding thereto) for fixing a point whose displacement from a stationary or datum point (after the type wheel is in equilibrium or load representing position) determines the aforesaid fractional large unit which controls the adjustment of the type sector.

As shown particularly in Fig. 3, the type sector is oscillated by a pull rod 18 operating a lever 19 pivoted about axis 16 and carrying a gear sector 21. The latter meshes with a gear sector 22 pivoted about axis 23 and carrying rigidly connected therewith a gear sector 24 which meshes with a gear sector 25 on type sector 13. The radius of gear sector 25 is substantially smaller than that of sector 21, and the latter in turn is substantially shorter than the radius of gear sector 24. Thus the angular movement of lever 19 is very substantially multiplied in the movement of type sector 13. The range of movement of pull rod 18 is substantially that of the spacing between adjacent teeth 14, whereas that for type sector 13 is the angular distance which embraces the 10 numbers thereon.

The pull rod 18 carries a pawl 26 pivoted at 27 and provided with a projection or tooth 28 adapted to swing into the line of travel of and to engage a tooth 14. In retracted position, projection 28 is clear of the teeth 14 and does not interfere with the free movement of type wheel 10 (see Fig. 4). Upon rotation about axis 16, projection 28 is brought into the path of travel of teeth 14 and eventually engages the tooth representing the highest whole large unit in the weight of the load, the displacement of which tooth from a fixed datum point represents the size of the additional fractional large unit in the weight of the load. During the movement of projection 28, the pull rod 18 causes type sector to rotate (in a counterclockwise direction). Upon engagement with the aforesaid tooth 14, the pawl 26 is oscillated (since type wheel 10 is held against movement) thereby causing its extremity 29 to enter a notch 31 in the type sector. The notches 31 in the type sector are here shown carried in a rim below the type. Their spacing corresponds with the type spacing on the sector. When the projection 28 seats in a notch, movement of the type sector is arrested. The relation of notches and type on the type sector is such as to insure type alignment with type wheel 10. Until projection 28 engages a tooth 14, the pawl is held clear of notches 31 by spring 32.

Pull rod 18 is actuated by a rod 33 which has a range of travel at least equal to the maximum movement of rod 18. A lost motion connection between the rods is provided in the form of a normally stressed spring 34 carried inside a sleeve 35 on rod 33, engaging a collar 36 on rod 18. The compression in spring 34 is sufficient to insure movement of the type sector and pawl 26 but allows continued movement of rod 33, after that of rod 18 and type sector 13 has been arrested.

Rod 18 advantageously carries the printing hammer 37, thereby insuring alignment of the hammer with the type representing the weight record. While such position varies slightly, depending upon the extent of movement of type sector 13, such movement is not sufficient substantially to displace the impression on the printing tape 38 or other record. The character of the displacement depends upon whether the number extends across or longitudinally of the tape or other record. Where, as in the present instance, the number extends across the tape, the alignment of successive numbers is uniform—only their spacing slightly varies.

Printing hammer 37 is actuated, in this instance, by the plunger 39 whose face is wide enough to insure engagement with the printing hammer, regardless of such slight shifting of the hammer as may occur in positioning the type sector.

When idle, the type sector and pull rod 18 are retracted by spring 41 to the position shown in Fig. 3 against stop 42, thereby clearing the type wheel.

It will be understood from the foregoing that the extent of movement of pull rod 18 and type sector 13 depends upon the displacement between the projection 28 and the adjacent teeth 14. With a minimum displacement, the type sector will be moved only sufficiently to bring "0" into type alignment. On the other hand if there be maximum displacement, the type sector will have a maximum movement, resulting in the positioning of the number "900" in alignment with printing position.

In Fig. 6, presently referred to, is illustrated a form of mechanism designed for a fixed printing position. This involves adjustment of the printing wheel 45 to bring the load representing type into alignment with printing position. The same principle of determining the position of the auxiliary printing element (in this case in the form of a printing drum 46) by the extent of movement of a pawl prior to the engagement of a tooth on the printing wheel, is employed. The pawl 47 is here shown carried on a longitudinally movable link 48 adapted to swing laterally sufficiently to bring the tip of the pawl into the path of travel of the teeth 49, which, in this instance, are formed in one edge of rim 51 carrying the type 52. Link 48 is pivoted at 53 to the lever 54 (the latter being pivoted at 55 to a fixed portion of the machine) and is pulled toward the type wheel by a light spring 56. The pawl is carried between two nuts 57 on a threaded extremity of link 48, to allow it to be shifted in adjusting the apparatus.

The pawl and its link 48 are actuated by a pull rod 58 connected to a bell crank lever 59 pivoted on the axis 55 and connected to link 48 by spring 61. Lever 59 and pull rod 58 are normally held in retracted position by spring 62. In turn a pin 63 carried by lever 59 holds lever 54 in its neutral position in which the offset 64 on link 48 engages a stop in the form of an adjustable screw 65, thereby serving to swing the link sufficiently to hold pawl 47 out of the path of travel of teeth 49. It should be understood that spring 56 is not sufficiently strong to interfere with the aforesaid.

As pull rod 58 is advanced it rocks bell crank lever 59 in clockwise sense, and lever 54 is caused to follow under the tension of spring 61. Pawl 47, therefore, is moved into operative position just as soon as the offset 64 is withdrawn from stop 65. Movement continues until pawl 47 engages a tooth 49. Further movement of link 48 and lever 54 is impeded by this tooth engagement to such extent that the tension of spring 61 is overcome, the rotation of lever 54 is momentarily stopped while that of arm 67 of bell crank 59 continues. Such relative movement depresses pawl 68 (pivoted to arm 67 at 69 and connected to lever 54 by link 71) into engagement with a lever 72 carrying a series of notches 73 corresponding with the unit increments on auxiliary printing element 46. Prior to such engagement, the auxiliary printing element 46 is held in its waiting position by spring 66. The particular notch engaged by pawl 68 depends upon the extent of angular movement of levers 54 and 59 relative to lever 72 (which has been held in a fixed position against adjustable stop 74) at the time the pawl is depressed. When thus connected by pawl 68 to lever 59, continued movement of the latter (against the resistance offered by type wheel 45) is communicated to lever 72 and thereby to auxiliary printing element 46 through rack 75 and pinion 76. As here shown, rack 75 is slidably mounted on guide rolls 77 and carries an adjusting screw 78 at its extremity which is engaged by lever 72.

The operation of pawl 68 is illustrated in Figs. 6ª, 6ᵇ and 7. The distance between the full line position of pawl 47 (such being the position of its first engagement with the type wheel) and the tooth 49 determines the angular movement of pawl 68 relative to the notches 73 in lever 72. When the pawl meets resistance by engagement with a tooth (as shown in the intermediate position in Fig. 7) pawl 68 moves into a notch in lever 72 and determines the extent to which the auxiliary printing element is rotated. As shown by way of example in Fig. 6ᵇ, the pawl 47 first strikes the typewheel at reading 196,700 and which will be assumed to represent the reading to be registered. After striking the wheel the pawl moves to right by distance S which equals tooth spacing and wheel type spacing. Before striking the "196" tooth it has passed through 70% of this distance S, and the auxiliary type drum has not moved. When pawl strikes tooth, arm 72 is engaged and the typewheel is then moved to the right through 30% of distance S, carrying the number "196" to printing position, and the type drum 46 is rotated through three of its divisions, bringing reading "700" in line with the "196" numeral of typewheel in printing position.

Thus the distance between face of pawl 47 in Fig. 6b and the face of next tooth to right determines the angular movement of tip of pawl 68 about axis 55 before this pawl 68 engages a tooth 73 of arm 72—or, in other words, the number of teeth 73 skipped before making engagement.

It is to be noted, however, that some of the above details are arbitrary in that they depend upon whether the teeth of the typewheel are so made that the wheel may be pushed forward by the pawl (to right in Fig. 6b) or pushed backward (to left in Fig. 6b). Similarly in Fig. 3, if typewheel teeth pointed in the opposite direction the details would require corresponding alteration.

After type wheel 45 has been moved to position representing the weight of the load, a brake is applied thereto which, while not absolutely preventing further rotation of the type wheel, causes the latter to present sufficient resistance to movement to insure the operation of pawl 68 as aforesaid. One appropriate form of braking mechanism is shown (Figs. 17 and 18) in the form of a pair of levers 79 pivoted at 81 and operated by a rotary cam 82 located between and engaged by the opposite extremities of the levers. Braking pressure is applied by springs 82 carried by rod 83 and operating upon levers 79. The latter carry blunt-pointed screws 84 which bear against the brake drum 85 of the type wheel. The high portions 86 of cam 82, therefore, serve to release the brake during the operation of the scale and the low portions 87 function to permit application of the brake during the operation of the recording mechanism.

After pawl 68 has engaged lever 72, as aforesaid, movement continues to a predetermined point fixed by the engagement of the arm 67 with the stop 88 (Fig. 6) to bring a number on the type wheel into the fixed printing position. The auxiliary printing element 46 is correspondingly rotated so that the number determined by the notch engaged by pawl 68 is located in alignment with the printing position.

The successive movements of the positioning mechanism are illustrated in Figs. 6ª and 7. In each of these figures the full line position illustrates the beginning of the positioning operation. The first dotted line position indicates engagement of pawl 47 with a tooth and the ensuing movement of pawl 68 into a notch. The final dotted line position corresponds with the arrival of both type wheel 45 and printing element 46 in printing position.

Thereupon the printing hammer is operated to impress the tape 91 or other record and the interposed inking ribbon 92 upon the type in printing position to make a record. Successive specimen records are illustrated in Fig. 24. By employing a printing hammer with a wide face 89 (as shown in Fig. 22) it is possible to make a proper impression regardless of the slight variations in position of the type in printing position. It will there be noted that the type of the auxiliary printing element may be smaller than the type on the type wheel, although they are large enough to be quite legible.

Any appropriate ribbon and tape feeding mechanisms may be employed, of which those shown in the drawings are merely illustrative. The ribbon is wound on and unwound from spools 93 and 94 (Figs. 22 and 23). Each of the spools is provided with a ratchet 95 which may be selectively operated by pawls 96 which may be manually shifted to operative position. The pawls are here shown carried by a rocking frame 97 which is oscillated by lever 98. To disconnect a pawl, it is simply inverted (as shown in Fig. 22) and the opposite pawl is swung into engagement with its ratchet. A pawl 99 is provided for preventing accidental reverse rotation of the ratchet wheels during the oscillation of the pawls. Lever 98 is, in this instance, oscillated to advance the ribbon by a bell crank arm 101 (Fig. 6) which is connected to bell crank lever 59 by link 102 and oscillated once for each operation of the recording mechanism. The ribbon 92 is shown passing over guide members 103 which locate it in printing position and make it possible to return the ribbon to a winding roll on the same axis as the feeding roll.

The record tape 91 (represented by long line in Fig. 15) is unwound from roll 104 and rewound upon roll 105 after passing across the printing position and around a spacing device in the form of a wheel 106, whose function is to insure uniform increments of feed or uniform spacing of records, regardless of increasing size of the rewound roll. The spacing wheel 106 is given a uniform movement upon each cycle of operations, by a rotating finger 107 carried by and rotating with drive shaft 108. The finger is adapted to engage a roller stud 109 carried by the spacing wheel 106 and by which the latter is given a fractional rotation for each revolution of shaft 108 and finger 107. The latter shaft is driven by shaft 119 (through one-to-one ratio spiral gear, see Figs. 8 and 16) which, as presently explained, makes one revolution for each cycle of operation. The spacing wheel is here shown provided with four roller studs 109 and therefore makes one-quarter revolution for each cycle of operation. The record tape is held in frictional engagement with the spacing wheel by friction roller 110 carried by pivot arm 111. A stop pawl 112 prevents reverse rotation of the spacing wheel by engagement with a roller stud 109. The rewinding wheel 105 is driven from shaft 108 by a spring belt 113 which allows slippage of the belt pulleys when the rewound tape roll increases in size.

As shown in Fig. 24, the record tape is arranged to receive the weight record on the face next the type wheel, and is promptly inverted in passing over guide 90 to render the weight record visible on the ensuing advance of the tape which occurs in the same cycle of operations immediately after actuation of the printing hammer. This arrangement makes it possible with the same type arrangement (the type are reversed as shown in Figs. 3 and 6) to print tape as well as cards, the latter being so thick that an impression cannot be made through them as has heretofore been done with tape for the sake of visibility but with a type wheel having normal type arrangement.

The mechanism for controlling the sequence of the foregoing operations is illustrated in Figs. 8 to 13. As here shown, a shaft 115 rotated slowly and continuously by motor 116 through appropriate gearing 117 is periodically connected by a clutch mechanism 118 designed to rotate shaft 119 one revolution for each cycle of operations. Clutch mechanism 118 (Figs. 12 and 13) is actuated by solenoid 121 which operates to depress lever 122 until it clears pawl 123 allowing the latter to be pulled by spring 124 into operative engagement with ratchet wheel 125 carried by and rotating with shaft 115. Pawl 123 is carried on a disc 126 which drives shaft 119. When solenoid 121 is energized, ratchet wheel 125 and disc 126 are operatively connected and rotate until pawl 123 has made one revolution at which time it is re-engaged by lever 122, the latter, in the meanwhile, restored to its initial position by de-energization of the solenoid and withdrawn from engagement with the ratchet wheel.

As here shown, after the scale has come to balance, and the type wheel has resumed a position representing the weight of the load, the braking mechanism (Figs. 17 to 19) is operated by a partial rotation of cam 82 which moves the low portions of the cam opposite the lever arm 79. In this instance, cam 82 is rotated by shaft 119 through spiral gears 131 and 132 and shaft 133 (Figs. 8 and 11). The low portions of the cam are made long enough to maintain braking action, at least during the setting of the printing elements.

After application of the brake, the pull rod 58 is actuated to set the printing elements as above described (Fig. 6). As here shown (Figs. 8 and 10) the pull rod is connected to lever 134 which is periodically oscillated by a cam 135 carried on shaft 119. Lever 134 is provided with an adjusting screw 136 to limit the position to which it may be retracted by spring 62.

The printing hammer (which thereupon makes an impression) is, in this instance, operated by solenoid 137 (Fig. 22) through a lever 138. Lost motion between printing hammer and lever 138 (to permit a slight advance of the hammer after arrest of the lever and to effect rebound to lift the hammer from the tape) is provided by the elongated slot 139 in the printing hammer plunger 141. In operation, movement of lever 138 is arrested (by engagement of the solenoid plunger with its housing) just short of bringing the hammer into contact with the tape, the momentum of the hammer carrying it into actual contact with the type and the slot 139 allowing slight independent movement for this purpose. The plunger is slightly elevated immediately after impact by spring 142. Adjustment of the action of rebound spring 142 is affected by varying the length of the small plunger 143 which is placed between the spring and lever 138.

Solenoid 137 is actuated in this instance by an electric switch 144 (which may advantageously be of the type shown in Fig. 9) whose contacts are closed at the proper time by a cam 145 on shaft 119.

To illustrate the operation of the apparatus, it is shown equipped for motion weighing, such, for example, as the weighing of railroad cars. It will be obvious, however, that the apparatus is capable of general use. The form of motion weighing here illustrated is so-called gravity weighing wherein cars pass in uncoupled relation across the scale platform diagrammatically illustrated at 151 (Fig. 33). Controlling devices are advantageously employed for preventing error in the making and recording of weights. Such devices operate, for example, to prevent operation of the recording mechanism until a car is wholly and alone on the scale platform and also to prevent operation if another car partly enters the scale platform before a record of the weight of the preceding car has been made. The details of construction in weighing of this character are described in co-pending Haegele application, Serial No. 33,305 and are here illustrated only diagrammatically in Fig. 33.

The condition of the circuits and controlling elements illustrated in Fig. 33 is that just prior to the entry of a car on the scale platform. Such condition of the circuits is visually indicated by the glowing of both the entering and exit lamps L1 and L2. As a car enters the scale platform, the leading wheel of the leading truck closes contacts C21 by operating a switch element here represented by switch lever 152. In this connection it should be noted that if the cars to be weighed are double-truck cars (instead of four-wheel cars as here shown) switch lever 152 is replaced by an elongated bar, such as illustrated in said Haegele application, which will be depressed only once for each car truck. In other words, the arrangement is such that the contacts C21 are closed and opened twice as a car passes completely into the scale platform. The closing of contacts C21 establishes a circuit through contacts C1 energizing relay coil R1. This and similar relays are so-called locking relays of a type which may be purchased on the open market and are characterized by a toggle lever and a pair of coils which make it possible to open and close the switch contacts operated by the relay with only momentary energization of a relay coil. The relay maintains its position unenergized until the other relay coil is momentarily energized.

The energizing of the relay coil R1 opens contacts C11 and C4 and closes contacts C2 and C10. This among other things opens the circuit through lamp L1. A circuit through contacts C21 also energizes relay coil R9, thereby closing contacts C15. When the lever 152 is allowed to rise, the contacts C21 are opened and C22 are closed. A circuit through contacts C22, C29 and C2 (now closed) energizes relay coil R2, thereby closing contacts C3 and C5 and opening contacts C1 and C12.

When lever 152 is again depressed, opening contacts C22 and closing contacts C21, the circuit through the latter and contacts C3 (now closed) energizes relay R3, thereby restoring its contacts to the position illustrated in Fig. 33. When the car passes wholly upon the scale platform, the lever 152 is again allowed to rise, opening contacts C21 and closing contacts C22, a circuit being established through the latter and contacts C29, C4, and C5 to energize relay coil R4, thereby restoring its switch contacts to the position illustrated in Fig. 33 and breaking the circuit through relay R4 (by opening contacts C5). This condition is indicated by the lighting of lamp L1 (upon closing of contacts C12).

A circuit is now established through contacts C11, C12, C13, C14, and C15 (now closed) to energize clutch solenoid 121 (see Figs. 8, 12 and 13). Shaft 119 is thereupon given a single revolution during which cams 135 and 145 successively and respectively actuate the positioning of the printing elements and the printing hammer. To allow sufficient time for the scale to come to balance, the printing elements are not positioned and the printing hammer is not actuated until a few seconds after the car has passed entirely upon the scale platform.

Shaft 119 is advantageously used as a timing means (since its period of rotation is substantially uniform) and the timing period is adjusted by varying the positions of cams 135 and 145 relative to the idle position of pawl 123 as shown in Fig. 12. Such adjustment is effected in this instance by angularly adjusting the shaft 119 relative to disc 126, for which adjustment the shaft is provided with an arm 155 carrying a retractable pin 156 which may be placed in any one of a series of holes 157 in disc 126. The illustrated adjustment of the arm (Fig. 13) provides a timing period of four seconds. Adjustment in a clockwise direction relative to disc 126 increases the period and in a counterclockwise direction decreases the period. The limits of adjustment here shown are from three to five seconds. The angular adjustment of cams 135 and 145 changes the interval between commencement of rotation of shaft 119 and the time when the cams respectively engage lever 134 and switch 144 (closing contacts C16.) The circuit established upon the closing of contacts C16 includes contacts C11, C12, C13, C14, C15, C16 and the printing hammer operating solenoid 137.

A slight further rotation of shaft 119 causes the cam 158 to close contacts C17, thereby energizing coil R10 to open contacts C15. The breaking of the circuit through contacts C15 deenergizes clutch solenoid 121 and printing solenoid 137. Therefore, when shaft 119 completes its revolution, lever 122 is restored to its initial position for withdrawing pawl 123.

When alternating current is available, its timing characteristics may be utilized by employing a synchronous motor as motor 116.

When the exit switch lever 159 is depressed, closing contacts C23, a circuit is established through contacts C6 to energize relay solenoid R5. Release of switch lever 159 closes contacts C24 and establishes a circuit through contacts C32 and C7 (now closed) to energize relay solenoid R6. When the second wheel or truck again closes contacts C23, a circuit is established through contacts C6 to energize relay coil R7. Release of the lever for a second time closes contacts C24 and establishes a circuit through contacts C32, C9, and C10 to energize relay solenoid R8. When the latter occurs, contacts C10 are opened to break the circuit through relay solenoid R8. It should be noted in connection with relay solenoids R4 and R8 that the contacts C5 and C10 respectively delay their opening until the relay toggle has passed the center so as to insure complete operation of the relay, notwithstanding the fact that the circuit may then be broken through the respective contacts C5 and C10.

The system is advantageously provided with push button controlled contacts C29, C30, and C31, C32, in series with the respective track lever switches, to permit duplication of the action of the latter to restore the system to normal condition in the event a track lever be accidentally depressed. The switch button also serves as means for adjusting the operation of the control system.

In the event a car should travel across the scale platform and depresses exit switch lever before the elapse of the predetermined interval which should precede actuation of the printing hammer, relay solenoid R5 is energized, opening contacts C13, breaking the circuit through printing hammer actuating solenoid 137, and thereby preventing the actuation of the latter, even though contacts C16 are closed by the printer controlling cam 145.

Likewise if a following car should attempt to enter the scale platform before the predetermined timing period has elapsed and a record has been taken, the closing of contacts C21 serves to open contacts C11 and the circuit to solenoid 137, thereby preventing the operation of the printing hammer.

To protect the type wheel against possible damage through change of load on the scale platform during the weighing and recording cycles by reason of the car prematurely partly leaving the scale or another partly entering the scale, pawl 47 is designed to be withdrawn or rendered inoperative by the action of solenoid 161. The latter is energized under the above circumstances if switch lever 152 be prematurely depressed to energize relay coil R1 to close a circuit to solenoid 161 through contacts C18.

Solenoid 161 is likewise energized (under the foregoing conditions) if exit switch lever 159 be depressed to energize relay coil R6, thereby closing contacts C19 and establishing a circuit to solenoid 161 through contacts C19 and C20.

Pawl 47 is in this instance operatively connected to solenoid 161 through a link 162 and a rocking cam 163 located between the solenoid core and the extremity 164 of the link. The solenoid, therefore, functions either to withdraw the pawl from engagement with the type wheel (if cam 135 has previously acted on pull rod 58) or to prevent advance of the pawl. To prevent operation of solenoid 161 (by depression of switch levers 152 and 159) during the normal cycle of operations, the solenoid circuit is secondarily controlled by contacts C20 which are closed, in this instance, by cam 165 on shaft 119. The cam is designed and timed to close contacts C20 only during the critical period. At other times, contacts C20 are open.

The load responsive member is here shown in the form of a conventional scale beam 171 connected with the type wheel 45 by means of a rack 172 and pinion 173, the latter being mounted on type wheel shaft 174. The displacements of the pinion and type wheel are advantageously made substantially proportional to the angular displacements of beam 171 by a mechanism (illustrated in Figs. 20 and 21) which approximately compensates for the lack of proportionality which heretofore existed. Without such mechanism, the increments of type wheel displacements (in the mechanism heretofore employed) would increase from "0" to the point at which the beam was perpendicular to the line of travel of the rack bar and would then decrease to full load. Compensation for this variation is effected, in the present instance, by mounting the rack bar so as to move in a fixed path and connecting the same to the beam by a link, in the form of a yoke 175, which is pivotally connected to the upper portion of the rack. As here shown, the rack is pivotally suspended from bearings 176 at the upper portion of the yoke and is held against the pinion by an eccentric weight 177. Uniform meshing of the rack and pinion at their pitch lines is maintained by pitch line guides 178 whose faces coincide with the pitch line of the rack teeth, and which guides roll upon the faces of pitch circle guides 179 on the pinion.

The lower portion of the yoke is connected at bearings 181 to the beam. A stop member 182 carried by the yoke and normally spaced a slight distance back of the rack prevents the rack from completely unmeshing from the pinion in the event it is subjected to shock, such as high inertia forces. Normally, the stop member does not touch the rack.

The upper portion of the rack is constrained to travel in a straight line by anti-friction guiding means in the form of a pair of rolls 183 and 184 which respectively travel along guide surfaces 185 and 186. The shaft 187 is mounted in appropriate bearings 188 carried by the yoke and designed to minimize friction. Friction with the guiding surfaces 185 and 186 is minimized by employing rolls of slightly different diameter, the one of smaller diameter is designed to engage only the surface 185 and the larger one to engage only the surface 186. Surface 185 is set inwardly relative to clear the larger roll 184. Thus it is possible to eliminate lateral play in the vertical travel of the upper portion of the rack without increasing the friction of the guiding means as would be the case if the guiding roll or other element were designed to engage both sides of the guideway.

The compensating mechanism above described makes it possible to employ uniform type sub-divisions on the type wheel. The error resulting from uniform type spacing is so slight as to be negligible. Compensating mechanism of this character can be employed in connection with other load responsive members employing mechanism which involves similar error.

Loads on the scale are, in this instance, offset by a spring 189 (Fig. 32) though it is obvious that other load counterbalancing means such as a weighted pendulum might be employed. To avoid variation of spring characteristics on account of temperature changes, the spring is enclosed in a housing 191 containing a heating device in the form of an electric heater strip 192 controlled by thermostat 193 (see Fig. 33) by which uniform temperature conditions are maintained inside the housing. The upper portion of the spring is shielded from contact with outside temperatures by a shell 194 having a vent 195 therein to insure the circulation of warm air in the upper portion of the shell.

The dash pot 196 is also advantageously located inside the heater housing to maintain uniform viscosity of the dash pot oil.

To protect the apparatus from wear and injury due to vibration of cars passing idly across the scale platform or from the excessive weight of a locomotive, means are advantageously provided to assume the load of the system at a point between the scale platform and the apparatus which it is desired to protect. As here shown, a lock is applied directly to the steelyard rod 197 by a yoke 198 adapted to be elevated to remove the load of the steelyard rod from the beam knife elge 199, and to allow the beam to return to zero where a major portion of the weight of the beam is carried by the customary fixed support. The upper portion of the yoke is provided with a collar 201 below which is a ring 202 adapted to be elevated (when locking the apparatus) into engagement with the collar. Appropriate means for elevating the ring are here shown (Figs. 28 to 31) in the form of an eccentric 203 mounted on shaft 204 and carried in bearing supports 205. Rotation of the eccentric raises and lowers a crosshead 206 connected with ring 202 by rods 207.

The crosshead is provided with an indicator pin 208 adapted to project from housing 209 (as indicated at 211, Fig. 30) when the locking apparatus is moved to locking position.

The eccentric shaft 204 is, in this instance, driven by spiral gears 212 and 213 from shaft 214 (Fig. 2). The locking apparatus is advantageously driven by motor 116 through a solenoid controlled clutch comprising a ratchet 215 and an arm 216 carrying a pawl 217. The pawl is normally held out of engagement with the ratchet by a solenoid plunger 218 which is located in the path of the pawl arm 219. When released by operation of the solenoid 221, the pawl is drawn into engagement with its ratchet by spring 222.

The diagram of Fig. 33 includes an illustrative controlling circuit for operating the locking mechanism designed to function when the recording apparatus is rendered idle by cutting off the power. As here shown, the manually controlled switch arm 223 supplies power to the circuits by closing contacts C26 and C28. Another contact C27 is positioned to be engaged by contact arm 223 just before it leaves contact C26, thereby establishing a circuit through locking solenoid 221. The circuit through contacts C26 and C27 is only momentarily maintained, being broken upon the small further movement necessary to carry contact arm 223 clear of contact C26. Before breaking the momentarily established circuit, the locking clutch has been engaged and switch disc 224, associated with the clutch, has been rotated sufficiently to carry notch 225 therein out of alignment with switch contacts C25, thereby closing the latter and establishing a secondary power circuit through motor 116. The latter circuit is broken upon one complete revolution of the clutch, at which time the pawl arm 219 engages the solenoid plunger 218 to release the clutch, the solenoid in the meantime having been deenergized as explained above. When notch 225 again reaches alignment with and permits the opening of switch C25 the motor circuit is opened. Spiral gears 212 and 213 have a one-to-two ratio, thereby giving shaft 204 one-half revolution necessary to elevate crosshead 206. To release the lock, switch arm 223 may be moved to "on" position, again momentarily energizing switch solenoid 221 and producing another half revolution of eccentric 203.

A hand crank 226 (Fig. 27) is advantageously provided to permit hand operation of the locking mechanism. The handle is connected with operating shaft 204 through a clutch 227, whose teeth are arranged to disengage the clutch if the shaft 204 be rotated by the motor.

Obviously the invention is not limited to the details of the illustrative apparatus since these may be variously modified. Moreover it is not indispensable that all features of the invention be used conjointly since various features may be used to advantage in different combinations and sub-combinations.

Having described our invention, we claim:

1. In weighing apparatus the combination comprising a pinion rotatable to positions representing the weight of a load, a rack for rotating said pinion, a guideway having opposite parallel guiding surfaces, and anti-friction rollers carried by said rack and each adapted to travel along only one of such guiding surfaces thereby to constrain the rack to movement in a straight line.

2. Weighing apparatus of the character described comprising in combination a printing element movable to a position representing a load and carrying type for printing the weight of a load, mechanism for engaging said printing element to adjust the same to align the type in printing position, a printing device, timing means for controlling the operation of said printing device to insure a proper time interval to allow the apparatus to come to load balance position, and means for preventing engagement of said printing element by said mechanism in the event the balance of said apparatus is disturbed during said time interval.

3. Weighing apparatus comprising in combination a load platform and lever system, a load responsive member, recording mechanism for recording the load on the scale, a controlling circuit for actuating the recording mechanism, a connection for connecting the load responsive member with said lever system, and means controlled by said controlling circuit for engaging said connection to relieve the load responsive member of the load imposed thereon by said lever system.

4. Weighing apparatus comprising in combination a load platform and lever system, a load responsive member, recording mechanism for recording the load on the scale, a controlling circuit for actuating the recording mechanism, a connection for connecting the load responsive member with said lever system, means for engaging said connection for relieving the load responsive member of the load imposed thereon by said lever system, and means actuated upon the opening of said controlling circuit for operating said connection engaging means.

5. Weighing apparatus of the character described comprising, in combination, a load responsive printing element movable to a position representing the weight of the load and carrying type thereon for making a printed weight record, means for feeding a record tape over the face of the printing element at printing position, printing mechanism for impressing the tape against the printing element, means for supplying ink between the printing element and the tape, and means adjacent said printing position for inverting the tape to render the printed weight record on the tape visible in close proximity to said printing position.

6. Weighing apparatus comprising in combination a load platform and lever system, a load responsive member, recording mechanism for recording the load on the scale, a controlling circuit for actuating the recording mechanism, an element for connecting the load responsive member with said lever system, means for engaging said element to relieve the load responsive member of the load imposed thereon by said lever system, and controlling means operative upon the opening of said controlling circuit for actuating said means to engage said element.

7. In weighing apparatus of the character described, the combination comprising a printing element movable to a position representing the weight of the load and carrying type to print a weight record of the load, a printing hammer for delivering a blow to print said record, said printing hammer being carried by a slidable plunger, a solenoid operated lever for actuating said plunger and provided with a stop for limiting the advance of the lever at a point just short of the point of impact of the hammer, and resilient means associated with said lever for allowing said hammer to make an impact after movement of said lever has been arrested.

8. Weighing apparatus of the character described comprising in combination a load responsive member movable to a position representing the weight of the load, said member being subdivided into weight units and carrying type at such subdivisions corresponding to the load represented thereby and being provided with stop elements at each such subdivision, a printing device carrying type representing fractions of said weight unit, mechanism adapted to be operatively connected to said printing device upon engagement with one of said stop elements and to move said load responsive member a fraction of a subdivision to carry it into printing position, and to move said printing device by an amount corresponding to the movement of said weight responsive member.

9. Weighing apparatus of the character described comprising in combination a printing wheel movable to a position representing the weight of a load, said wheel carrying type representing whole weight units and arranged with reference to a predetermined point to exhibit the weight of the load in whole units, stop elements carried by said printing wheel in positions corresponding to the whole weight units of said wheel, a supplementary printing device carrying type for printing fractions of a whole unit, and mechanism adapted to engage a stop element on said wheel and controlled by the distance from said predetermined point of the type representing the whole units in the weight of the load for moving said supplementary printing device to position type representing the proper fractional unit in registry with the type representing the whole units.

10. Weighing apparatus comprising in combination a swinging load responsive member movable to positions representing the weight of the load, weight indicating means comprising a rotary shaft adapted to be rotated by said weight responsive member to positions representing the weight of the load, a link pivoted at one end to said load responsive member and movable thereby in an arc and having its other end constrained to move in a straight line, an operating member connected to said other end of said link and movable thereby in a straight line, and means connecting said operating member to said shaft for rotating the latter.

11. Weighing apparatus comprising in combination a load platform and lever system, a load responsive member, a connection connecting the load responsive member with the lever system, a device adapted to engage said connection for relieving the load responsive member of the load imposed thereon by said lever system, and mechanism automatically operative when said weighing apparatus is rendered idle for actuating said device to relieve said load as aforesaid.

12. In weighing apparatus the combination comprising a load responsive member, a link for connecting the beam with the lever system of the weighing apparatus, a cam adapted to engage and elevate said link to relieve the beam of the load imposed thereon by the lever system, and means operative when the weighing apparatus is placed in operation for rotating said cam to lower said link into operative engagement with the said beam.

13. A weighing scale of the character described comprising in combination a printing element movable by the load to a position representing the weight of a load and having type spaced thereon throughout the range of the scale for printing large units in the weight of a load, an auxiliary printing member for printing fractions of large units of weight and having a range of movement substantially greater than a unit movement of said printing element, means controlled by the displacement of said printing element from a predetermined position for controlling the positioning of said printing member, and means for multiplying the movement of said auxiliary printing member.

14. A weighing scale of the character described comprising in combination a load responsive member movable to a position which represents the weight of the load on the scale, said member being subdivided into weight units throughout the entire range of the scale and carrying type at such subdivisions corresponding to the load represented thereby, means for holding said member temporarily in load representing position, an auxiliary printing device carrying type representing a plurality of subdivisions of a weight unit, and mechanism controlled by the distance from printing position of the type representing the whole units in the weight of the load for moving said auxiliary printing device to register in printing position that fractional unit by which the load exceeds the aforesaid whole units.

15. Weighing apparatus of the character described comprising in combination a single printing element movable to a position representing the weight of a load, said printing element carrying load printing type arranged thereon to represent and print the total of the large units in the weight of a load, a separate printing member carrying type for printing fractions of a large unit, means for moving said printing element from the position representing the weight of the load to carry the type representing the total of large units in the weight of a load into printing position, and means controlled by the extent of the aforesaid movement of said printing element for moving said printing member into alignment with printing position to print the fractional unit in the weight of the load.

16. A weighing scale of the character described comprising in combination a single printing element movable to a position which represents the weight of a load on the scale, said printing element carrying load printing type arranged thereon to represent and print the total of large units in the weight of a load, a separate printing member carrying type for printing fractions of a large unit, and means controlled by the displacement of the type representing the large units in the weight of a load from a fixed position for moving said printing member to carry type thereon representing the excess fractional unit in the weight of the load into alignment with the type representing the whole units in the weight of the load.

17. A weighing scale of the character described comprising in combination a printing element movable by the load on the scale to a position representing the weight of the load, said printing element carrying load printing type spaced thereon to correspond with the load subdivisions of said element throughout the range of said scale, a separate printing member carrying type spaced thereon to represent fractions of a single load subdivision of said printing element, and means controlled by said printing element for positioning the type on said printing member to print the fractional subdivision of load in alignment with the load record printed by said printing element.

18. In weighing apparatus the combination comprising a load responsive member movable by the load to a position representing the weight of the load, said member carrying characters spaced thereon to exhibit when in a predetermined position the weight of the load in whole units, a device associated with said load responsive member carrying characters for exhibiting fractions of a weight unit, and means controlled by the position of the said load responsive member with reference to said predetermined position for moving said device to carry the characters for exhibiting the proper fractional unit into alignment with the load exhibiting characters on said load responsive member, whereby to exhibit the full weight of the load in whole and fractional units.

19. Weighing apparatus of the character described comprising in combination, a load platform and lever system, a load responsive beam, a tension member for connecting the lever system with the beam to transmit the load thereto, and mechanism automatically operative when said weighing apparatus is rendered idle for engaging said tension member to assume forces transmitted thereto from the platform and for moving the tension member to relieve the beam sufficiently of dead load.

20. Weighing apparatus of the character described comprising in combination a swinging load responsive member movable to a position representing the weight of a load, a pinion adapted to be rotated responsively to the movements of said load responsive member, a rack for rotating said pinion, a rack operating member connected to said rack and to a point on said load responsive member which moves in an arc, means for mounting said rack to move in a straight line independently of the movement of said load responsive member in an arc, and means for maintaining a constant relation between said rack and its pinion.

21. In a weighing scale the combination comprising a printing element carrying type movable to a position which represents the weight of the load, the type on said printing element being spaced thereon to correspond with decimal load subdivisions of said scale and arranged to register in proximity to printing position type representing the whole subdivisions in the weight of the load, a separate printing member carrying type spaced thereon and representing fractions of a single decimal subdivision of said printing element, and means controlled by said printing element for moving said printing member into position to print.

22. In weighing apparatus the combination comprising unit and fractional weight printing devices, the former being adapted to print whole units of weight and the latter to print that fraction of a whole weight unit by which the load exceeds whole units, means for moving the unit printing device into a position representing the entire weight of a load wherein the type corresponding to the whole units in the weight of the load are displaced from printing position by a distance corresponding to the amount by which the load exceeds that represented by the type corresponding to the whole units in the weight of the load, and mechanism controlled by the displacement of said type from printing position for moving said fractional weight printing device to bring type for printing the excess fractional unit into alignment with the type for printing the whole units.

23. In a weighing scale the combination comprising a printing element carrying type movable to a position representing the entire weight of a load, said printing element carrying load printing type arranged thereon to represent the total of the large units in the weight of a load, a separate printing member carrying type for printing fractions of said large unit, means controlled by the displacement of the type representing the total of the large units in the weight of a load from a fixed position for moving said printing member to print the proper fractional unit, and means for returning the printing member to a predetermined position after each operation thereof.

24. Weighing apparatus of the character described comprising in combination a printing element carrying type movable to a position representing the weight of the load, said type being spaced on said printing element to correspond with decimal load subdivisions of said element, said type embracing the capacity of the weighing apparatus, a separate printing member carrying type spaced thereon and representing subdivisions of a single decimal subdivision of said printing element, and means for aligning type on said printing element and printing member to print the weight of the load.

25. In a printing scale, in combination, a printing element adapted to be moved by automatic weighing mechanism and carrying type to print hundreds and tens digits, a strip carrying type to print units digits and lying adjacent the periphery of said printing element, and auxiliary means to move said printing element supplementally into definite positions and to move said strip into positions corresponding respectively to the degree of supplemental movement of said printing element.

OLIN H. BASQUIN.
OTTO P. HAEGELE.